US012264082B2

(12) United States Patent
Baskerville

(10) Patent No.: US 12,264,082 B2
(45) Date of Patent: Apr. 1, 2025

(54) WATER FLAVORING AND FILTERING ASSEMBLY

(71) Applicant: Dre'Shawn Baskerville, Hampton, VA (US)

(72) Inventor: Dre'Shawn Baskerville, Hampton, VA (US)

( * ) Notice: Subject to any disclaimer, the term of this patent is extended or adjusted under 35 U.S.C. 154(b) by 537 days.

(21) Appl. No.: 17/676,916

(22) Filed: Feb. 22, 2022

(65) Prior Publication Data

US 2023/0264976 A1 Aug. 24, 2023

(51) Int. Cl.
*C02F 1/00* (2023.01)
*C02F 1/68* (2023.01)

(52) U.S. Cl.
CPC .............. *C02F 1/003* (2013.01); *C02F 1/008* (2013.01); *C02F 1/686* (2013.01); *C02F 2201/005* (2013.01); *C02F 2307/06* (2013.01)

(58) Field of Classification Search
CPC .......... C02F 1/003; C02F 1/008; C02F 1/686; C02F 2201/005; C02F 2307/06; B67D 1/0031; B67D 1/0078; B67D 1/0888; B67D 2210/0001
USPC ...................................................... 210/348
See application file for complete search history.

(56) References Cited

U.S. PATENT DOCUMENTS

| 4,814,078 A * | 3/1989 | Stern ..................... C02F 1/003 210/438 |
| 5,922,378 A | 7/1999 | Kagan |
| 6,652,893 B2 | 11/2003 | Berson |
| 8,056,588 B2 * | 11/2011 | Somerby ............. B01F 35/2211 141/105 |
| 8,541,039 B2 | 9/2013 | Lackey |
| 2004/0003990 A1 | 1/2004 | Mansur |
| 2011/0226679 A1 * | 9/2011 | Lackey ................... C02F 1/003 210/85 |
| 2012/0107453 A1 | 5/2012 | Chase |

FOREIGN PATENT DOCUMENTS

WO    WO0107355    2/2001

* cited by examiner

*Primary Examiner* — Ekandra S. Miller-Cruz

(57) ABSTRACT

A water flavoring and filtering assembly includes a filtration unit that has an input and an outlet. The inlet is fluidly coupled to a fluid source thereby facilitating the outlet to dispense a fluid from the fluid source. The filtration unit includes a filtering element that is integrated into the input for filtering the fluid. A flavor dispenser is integrated into the filtration unit and the flavor dispenser includes a plurality of reservoirs. Each of the reservoirs contains a respective liquid flavor and a respective one of the reservoirs is actuatable to dispense a pre-determined volume of the respective liquid flavor into the filtration unit to enhance the flavor of the fluid.

10 Claims, 6 Drawing Sheets

US 12,264,082 B2

WATER FLAVORING AND FILTERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to water filtering devices and more particularly pertains to a new water filtering device for filtering and flavoring water. The device includes a filtration unit that includes a faucet and a filter for dispensing filtered water. The device includes a flavor dispenser that contains a plurality of liquid flavors. A respective one of the liquid flavors can be dispensed into the filtration unit for enhancing the flavor of the filtered water.

(2) Description of Related Art Including Information Disclosed Under 37 CFR 1.97 and 1.98

The prior art relates to water filtering devices including a water filtration vessel that includes a plurality of reservoirs and a filtration element for filtering water that passes between the plurality of reservoirs. The prior art discloses a water flavoring device that includes a flavor cartridge, an air pump for inducing turbulence into water for releasing polluting gases from the water and to facilitate a flavoring in the flavor cartridge to be infused into the water. The prior art discloses a filtering pitcher device that includes an upper reservoir, a lower reservoir, a filter disposed on the upper reservoir for filtering water that travels into the lower reservoir and an infusion tube for infusing an additive into the filtered water. The prior art discloses a water distillation device that includes a heating element to boiling water for distilling with water and a flavor injection unit for injecting a flavor into distilled water.

BRIEF SUMMARY OF THE INVENTION

An embodiment of the disclosure meets the needs presented above by generally comprising a filtration unit that has an input and an outlet. The inlet is fluidly coupled to a fluid source thereby facilitating the outlet to dispense a fluid from the fluid source. The filtration unit includes a filtering element that is integrated into the input for filtering the fluid. A flavor dispenser is integrated into the filtration unit and the flavor dispenser includes a plurality of reservoirs. Each of the reservoirs contains a respective liquid flavor and a respective one of the reservoirs is actuatable to dispense a pre-determined volume of the respective liquid flavor into the filtration unit to enhance the flavor of the fluid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
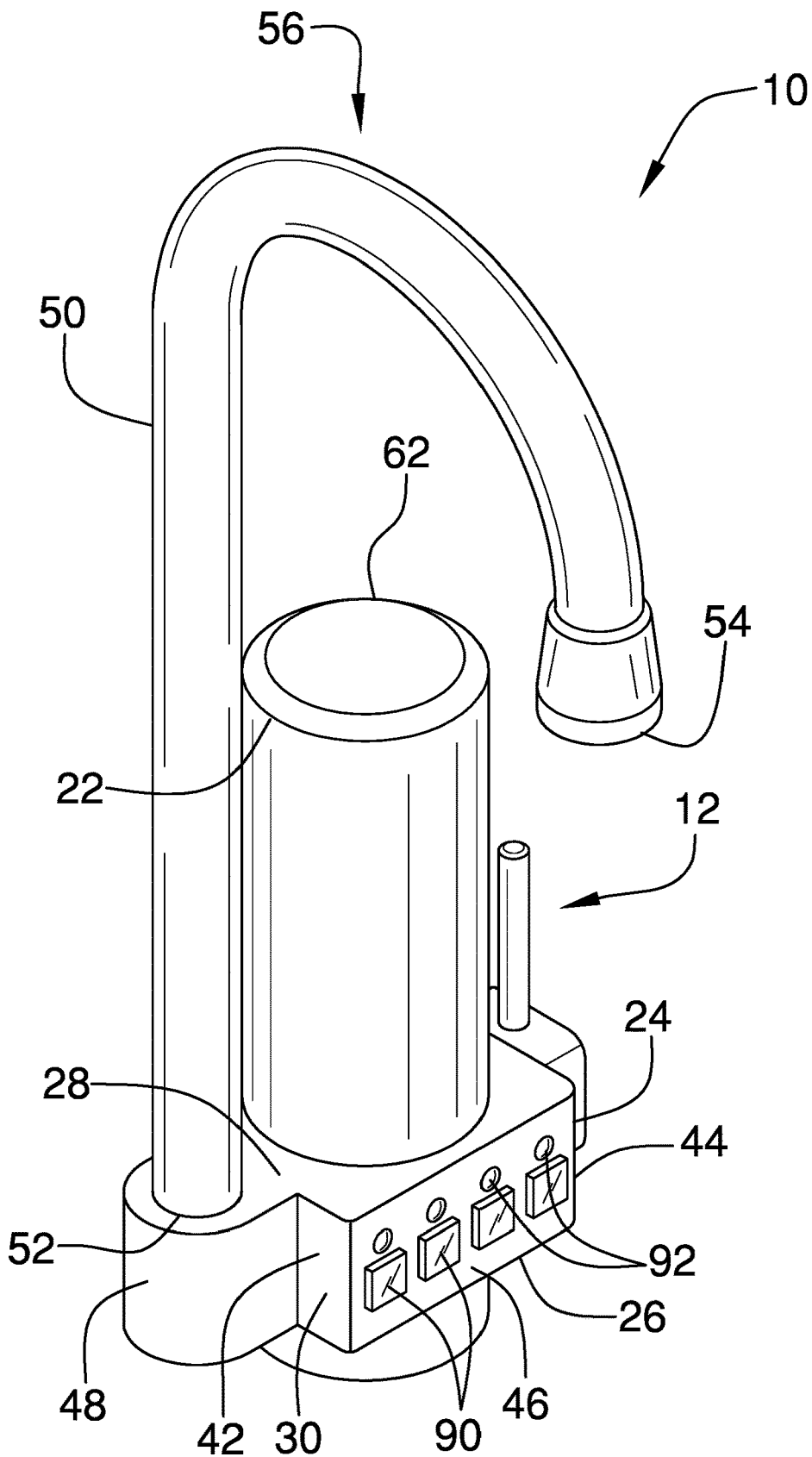
FIG. 1 is a front perspective view of a water flavoring and filtering assembly according to an embodiment of the disclosure.
Figure 2:
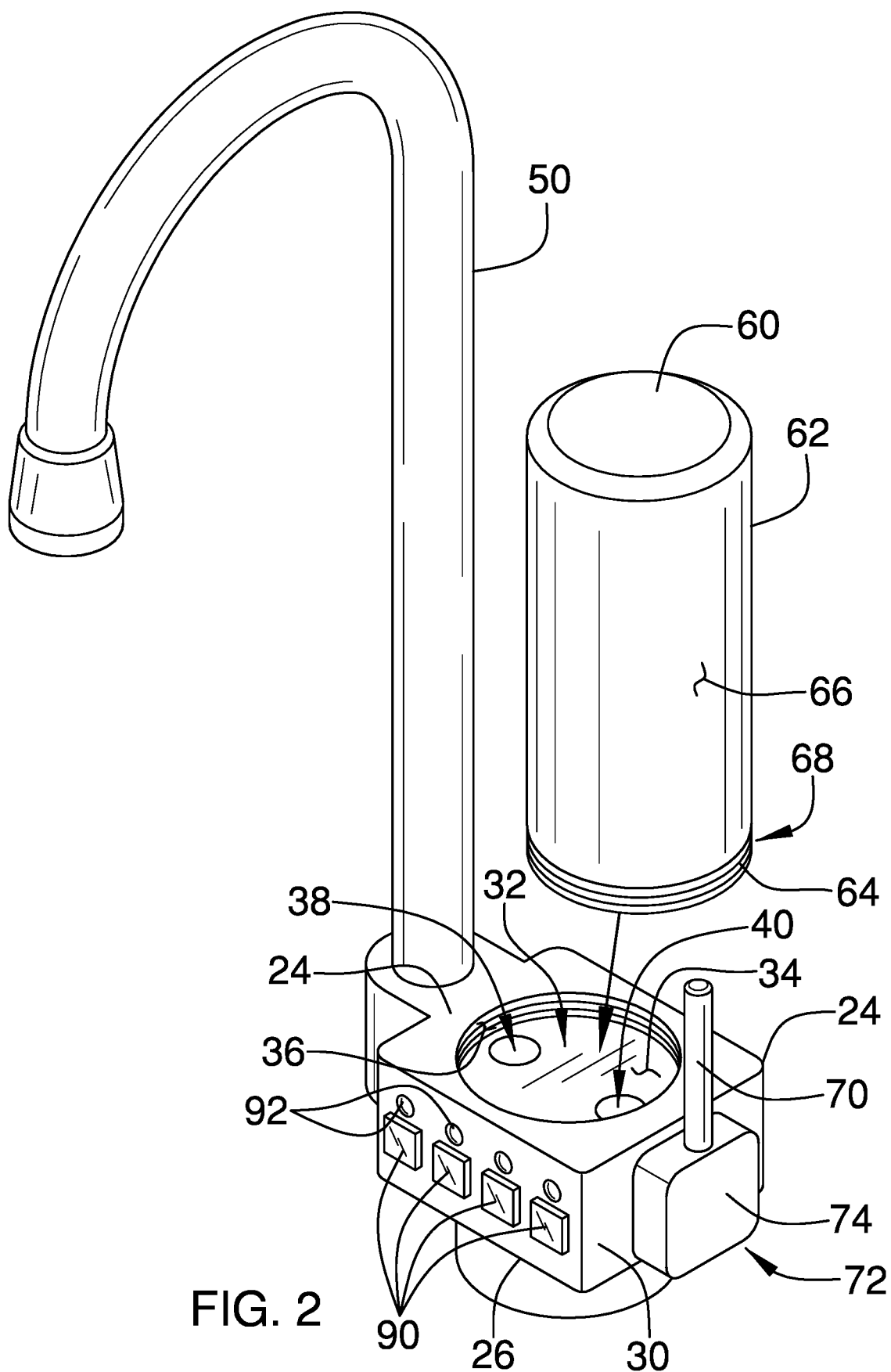
FIG. 2 is an exploded perspective view of an embodiment of the disclosure.
Figure 3:
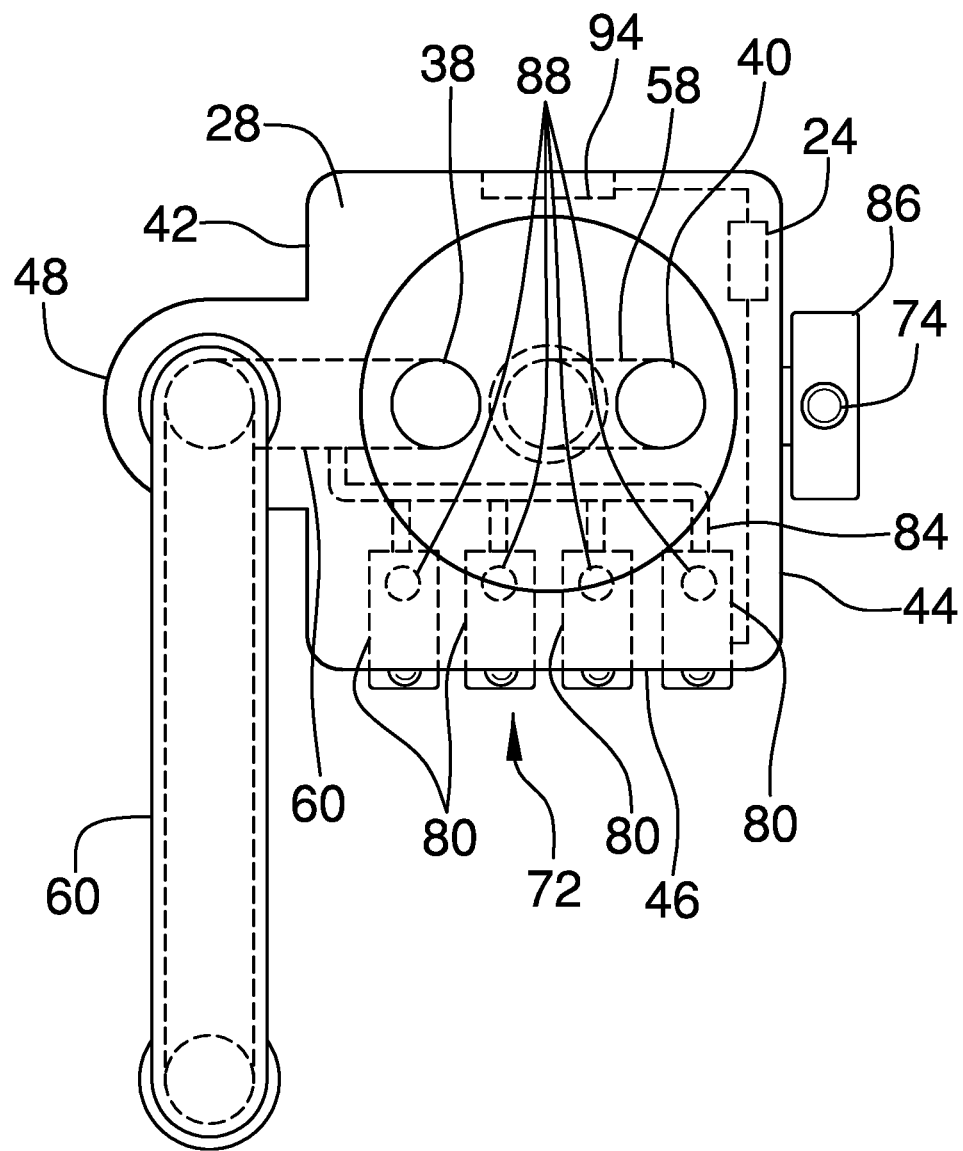
FIG. 3 is a top phantom view of an embodiment of the disclosure.
Figure 4:
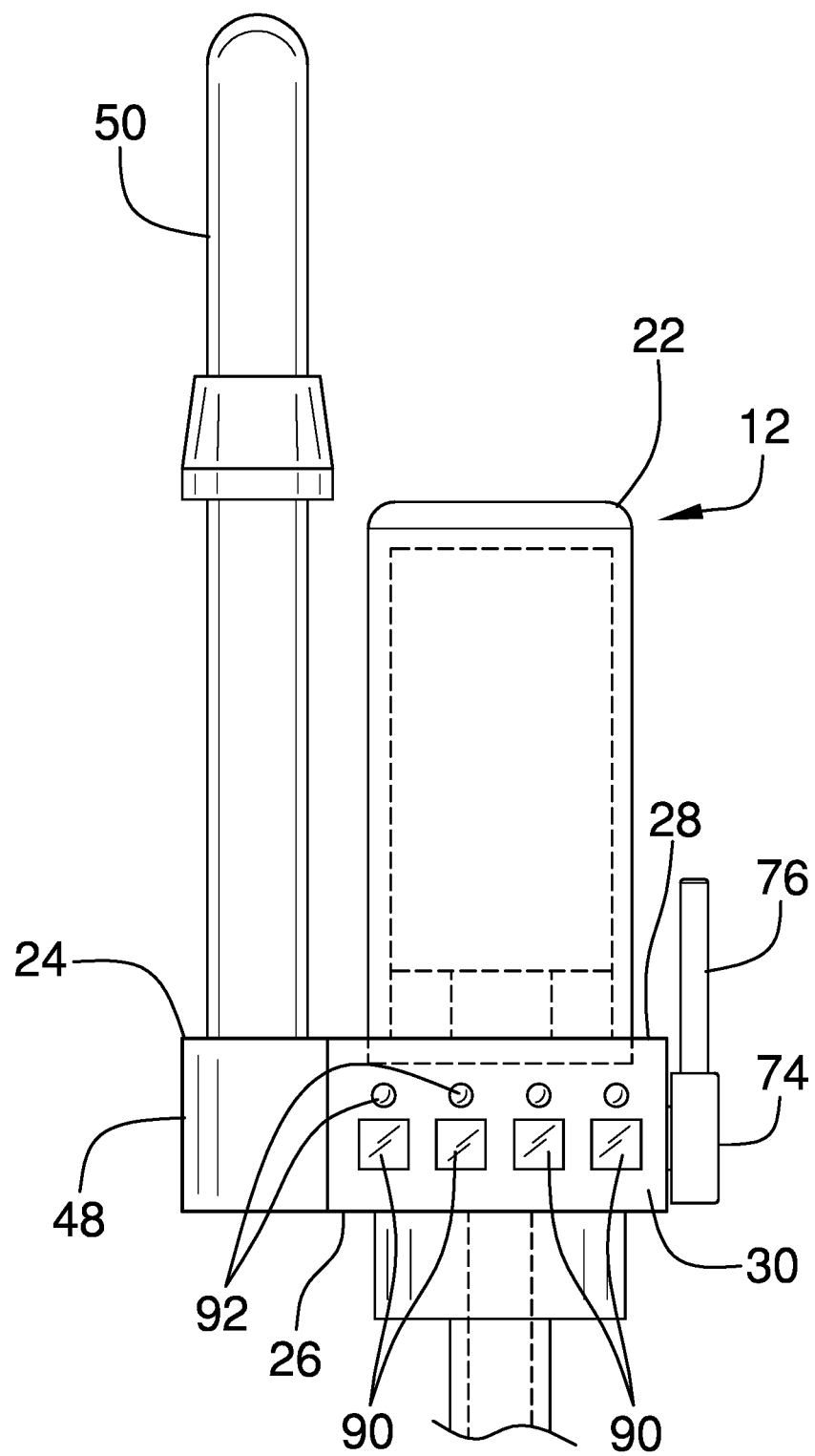
FIG. 4 is a front phantom view of an embodiment of the disclosure.
Figure 5:
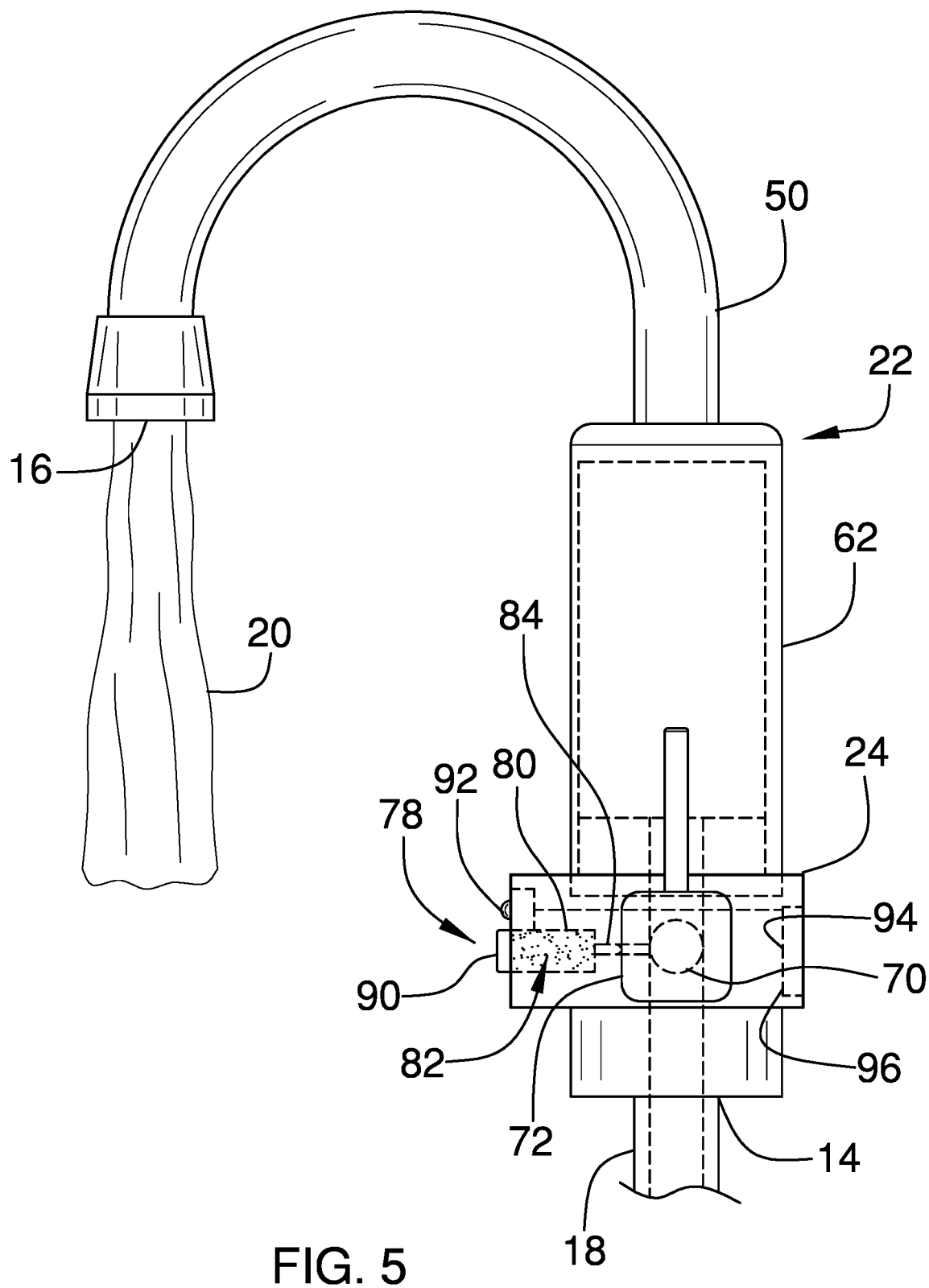
FIG. 5 is a left side phantom view of an embodiment of the disclosure.
Figure 6:
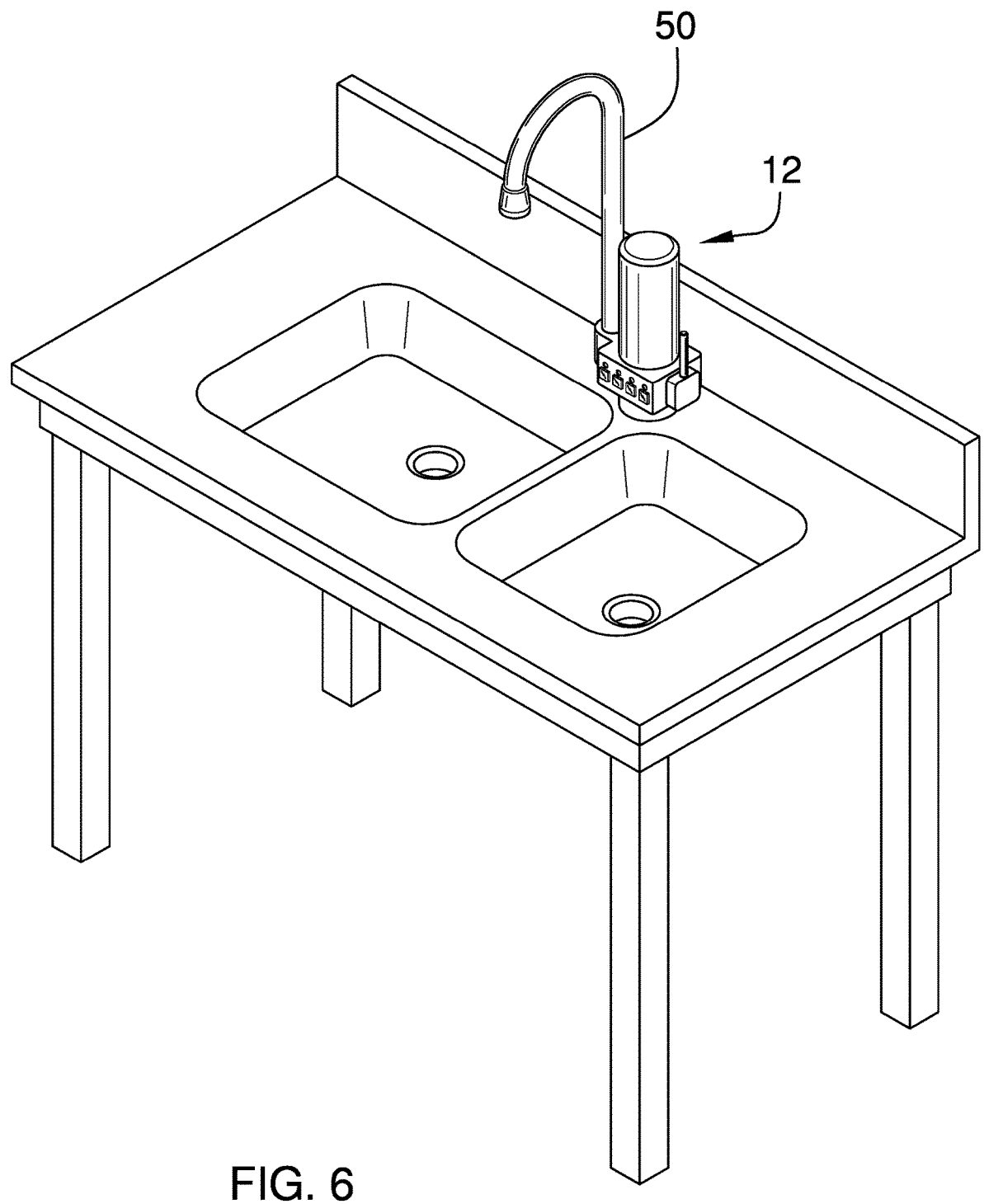
FIG. 6 is a perspective in-use view of an embodiment of the disclosure.

With reference now to the drawings, and in particular to FIGS. 1 through 6 thereof, a new water filtering device embodying the principles and concepts of an embodiment of the disclosure and generally designated by the reference numeral 10 will be described.

As best illustrated in FIGS. 1 through 6, the water flavoring and filtering assembly 10 generally comprises a filtration unit 12 that has an inlet 14 and an outlet 16, and the inlet 14 can be fluidly coupled to a fluid source 18 thereby facilitating the outlet 16 to dispense a fluid 20 from the fluid source 18. The fluid source 18 may be a water line in a kitchen and the fluid 20 may be water. Additionally, the filtration unit 12 may be positioned at a table in a restaurant such that the filtration unit 12 is accessible to patrons of the restaurant. The filtration unit 12 includes a filtering element 22 that is integrated into the inlet 14 such that the fluid 20 passes through the filtering element 22 for filtering the fluid 20.

The filtration unit 12 comprises a housing 24 that has a bottom wall 26, a top wall 28 and an outer wall 30 extending between the bottom wall 26 and the top wall 28. The inlet 14 is integrated into the bottom wall 26 and the top wall 28 has a well 32 extending downwardly toward the bottom wall 26. The well 32 has a lower bounding surface 34 and a lateral bounding surface 36, and the lateral bounding surface 36 is threaded. The lower bounding surface 34 has an output opening 38 extending into an interior of the housing 24 and the lower bounding surface 34 has an inlet opening 40 extending into the interior of the housing 24. The outer wall 30 has a first lateral side 42, a second lateral side 44 and a front side 46, and the first lateral side 42 has a lobe 48 extending laterally away from the first lateral side 42.

The filtration unit 12 includes a faucet 50 which has a lower end 52 and an upper end 54. The lower end 52 is coupled to the top wall 28 of the housing 24 and the faucet 50 is positioned on the lobe 48. Additionally, the faucet 50 has a bend 56 that is positioned between the lower end 52 and the upper end 54 such that the upper end 54 is directed downwardly. Additionally, the upper end 54 defines the outlet 16 of the filtration unit 12. The filtration unit 12 includes a first conduit 58 that is fluidly coupled between the inlet 14 on the bottom wall 26 of the housing 24 and the inlet opening 40 in the lower bounding surface 34 of the well 32. In this way the inlet opening 40 can receive the fluid 20 from the fluid source 18. The filtration unit 12 includes a second conduit 60 that is fluidly coupled between the output opening 38 in the lower bounding surface 34 of the well 32 and the lower end 52 of the faucet 50.

The filtering element 22 comprises a filter 62 that has a bottom end 64 and an outside surface 66, and the outside surface 66 has a threaded portion 68 that is positioned adjacent to the bottom end 64. The threaded portion 68 threadably engages the lateral bounding surface 36 of the well 32 in the top wall 28 of the housing 24. In this way the filter 62 receives the fluid 20 from the inlet opening 40 and directs the fluid 20 outwardly through the output opening 38 into the faucet 50 thereby facilitating the faucet 50 to dispense the fluid 20. The filter 62 may comprise a replaceable water filter of any conventional design that is commonly employed in water filtration systems.

The filtration unit 12 includes a valve 70 that is integrated into the housing 24 and the valve 70 is in fluid communication with the first conduit 58. The valve 70 is actuatable into an open condition to facilitate the fluid 20 to flow through the first conduit 58. Conversely, the valve 70 is actuatable into a closed condition to inhibit the fluid 20 from flowing through the first conduit 58. The valve 70 includes a handle 72 that is pivotally disposed on the second lateral side 44 of the outer wall 30 of the housing 24. The handle 72 includes a block 74 that is mechanically coupled to the valve 70 and which is spaced from the second lateral side 44 of the outer wall 30 of the housing 24. The handle 72 includes a lever 76 extending upwardly from the block 74 for manipulating the valve 70 between the open condition and the closed condition.

A flavor dispenser 78 is integrated into the filtration unit 12 and the flavor dispenser 78 includes a plurality of reservoirs 80 which each contains a respective liquid flavor 82. The liquid flavor 82 in each of the reservoirs 80 may comprise a non-toxic liquid flavor that is approved for human consumption. Furthermore, the liquid flavor 82 in each of the reservoirs 80 may have a unique flavor with respect to each other, including but not being limited to, fruit flavors, herbal flavors and any other natural flavor that is commonly associated with flavored beverages.

A respective one of the reservoirs 80 is actuatable to dispense a pre-determined volume of the respective liquid flavor 82 into the filtration unit 12 when the respective reservoir 80 is actuated. In this way the flavor dispenser 78 can enhance the flavor of the fluid 20. Each of the reservoirs 80 is removably positioned within the housing 24 and each of the reservoirs 80 has an outlet port 84. The outlet port 84 of each of the reservoirs 80 is in fluid communication with the second conduit 60 for releasing the liquid flavor 82 into the second conduit 60. The housing 24 may have a plurality of access openings to facilitate each of the reservoirs 80 to be removed and replaced in the housing 24.

The flavor dispenser 78 includes a control circuit 86 that is positioned within the housing 24. Each of the reservoirs 80 includes a dispensing element 88 and the dispensing element 88 in each of the reservoirs 80 is electrically coupled to the control circuit 86. The dispensing element 88 may comprise an electrically actuated pump or other similar mechanism that is capable of urging the liquid flavor 82 outwardly from the reservoirs 80. Additionally, the dispensing element 88 in each of the reservoirs 80 includes level sensing circuitry to facilitate the dispensing element 88 in each of the reservoirs 80 to determine the level of the liquid flavor 82 in the reservoirs 80. The flavor dispenser 78 includes a plurality of buttons 90 that is each movably integrated into the front side 46 of the outer wall 30 of the housing 24. Each of the buttons 90 is electrically coupled to the control circuit 86 and each of the buttons 90 is assigned to a respective one of the reservoirs 80. Furthermore, a respective one of the buttons 90 actuates the dispensing element 88 in the respective reservoir 80 to dispense the pre-determined volume of the liquid flavor 82 when the respective button 90 is depressed.

The flavor dispenser 78 includes a plurality of light emitters 92 that is each integrated into the front side 46 of the outer wall 30 of the housing 24 to emit light outwardly from the housing 24. Each of the light emitters 92 is electrically coupled to the control circuit 86 and each of the light emitters 92 is assigned to a respective one of the reservoirs 80. Additionally, each of the light emitters 92 is aligned with a respective one of the buttons 90. A respective one of the light emitters 92 is turned on when the dispensing element 88 in the respective reservoir 80 senses the level of the liquid flavor 82 in the respective reservoir 80 has fallen below a pre-determined volume. In this way the light emitters 92 visually communicate when any of the reservoirs 80 is depleted of the liquid flavor 82. The flavor dispenser 78 includes a power supply 94 that is positioned within the housing 24. The power supply 94 is electrically coupled to the control circuit 86 and the power supply 94 comprises at least one battery 96.

In use, the lever 76 is manipulated to actuate the valve 70 into the open condition thereby dispensing filtered water outwardly through the faucet 50 for drinking. A respective one of the buttons 90 is depressed, depending on the user's preference for flavor, to dispense the respective liquid flavor 82 into the filtered water. In this way the filtered water can be flavored according the user's preference for enhancing the flavor of the filtered water. Each of the reservoirs 80 is replaced when the reservoirs 80 are depleted of the liquid flavor 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water flavoring and filtering assembly for filtering water and imparting a selected flavor into the water, said assembly comprising:
 a filtration unit having an input and an outlet wherein said input is configured to be fluidly coupled to a fluid source thereby facilitating said outlet to dispense a fluid from the fluid source, said filtration unit including a filtering element being integrated into said input wherein said filtering element is configured to have the fluid pass through said filtering element for filtering the fluid; and
 a flavor dispenser being integrated into said filtration unit, said flavor dispenser including a plurality of reservoirs, each of said reservoirs containing a respective liquid flavor, a respective one of said reservoirs being actuatable to dispense a pre-determined volume of said respective liquid flavor into said filtration unit when said respective one of said reservoirs is actuated wherein said flavor dispenser is configured to enhance the flavor of the fluid; and
 wherein said filtration unit comprises:
  a housing having a bottom wall, a top wall and an outer wall extending between said bottom wall and said top wall, said input being integrated into said bottom wall, said top wall having a well extending downwardly toward said bottom wall, said well having a lower bounding surface and a lateral bounding surface, said lateral bounding surface being threaded, said lower bounding surface having an output opening extending into an interior of said housing, said lower bounding surface having an input opening extending into said interior of said housing, said outer wall having a first lateral side, a second lateral side and a front side, said first lateral side having a lobe extending laterally away from said first lateral side; and
  a faucet having a lower end and an upper end, said lower end being coupled to said top wall of said housing, said faucet being positioned on said lobe, said faucet having a bend being positioned between said lower end and said upper end such that said upper end is directed downwardly.

2. The assembly according to claim 1, wherein said filtration unit includes:
 a first conduit being fluidly coupled between said input on said bottom wall of said housing and said input opening in said lower bounding surface of said well wherein said input opening is configured to receive the fluid from the fluid source; and
 a second conduit being fluidly coupled between said output opening in said lower bounding surface of said well and said lower end of said faucet.

3. The assembly according to claim 2, wherein said filtration element comprises a filter having a lower end and an outside surface, said outside surface having a threaded portion being positioned adjacent to said lower end, said threaded portion threadably engaging said lateral bounding surface of said well in said top wall of said housing wherein said filter is configured to receive the fluid from said input opening and direct the fluid outwardly through said output opening into said faucet thereby facilitating said faucet to dispense the fluid.

4. The assembly according to claim 2, wherein said filtration unit includes:
 a valve being integrated into said housing, said valve being in fluid communication with said first conduit, said valve being actuatable into an open condition wherein said valve is configured to facilitate the fluid to flow through said first conduit, said valve being actuatable into a closed condition wherein said valve is configured to inhibit the fluid from flowing through said first conduit; and
 said valve includes a handle being pivotally disposed on said second lateral side of said outer wall of said housing, said handle including a block being mechanically coupled to said valve and being spaced from said second lateral side of said outer wall of said housing, said handle including a lever extending upwardly from said block for manipulating said valve between said open condition and said closed condition.

5. The assembly according to claim 2, wherein each of said reservoirs is removably positioned within said housing, each of said reservoirs having an outlet port, said outlet port of each of said reservoirs being in fluid communication with said second conduit for releasing said liquid flavor into said second conduit.

6. The assembly according to claim 1, wherein said flavor dispenser includes a control circuit being positioned within said housing, each of said reservoirs including a dispensing element, said dispensing element in each of said reservoirs being electrically coupled to said control circuit.

7. The assembly according to claim 6, wherein said flavor dispenser includes a plurality of buttons, each of said buttons being movably integrated into said front side of said outer wall of said housing, each of said buttons being electrically coupled to said control circuit, each of said buttons being assigned to a respective one of said reservoirs, a respective one of said buttons actuating said dispensing element in said respective reservoir to dispense said pre-determined volume of said liquid flavor when said respective button is depressed.

8. The assembly according to claim 7, wherein said flavor dispenser includes a plurality of light emitters, each of said light emitters being integrated into said front side of said outer wall of said housing wherein each of said light emitters is configured to emit light outwardly from said housing, each of said light emitters being electrically coupled to said control circuit, each of said light emitters being assigned to a respective one of said reservoirs, each of said light emitters being aligned with a respective one of said buttons.

9. The assembly according to claim 8, wherein a respective one of said light emitters is turned on when said dispensing element in said respective reservoir senses the level of said liquid flavor in said respective reservoir has fallen below a pre-determined volume wherein said light emitters are configured visually communicate when any of said reservoirs is depleted of said liquid flavor.

10. A water flavoring and filtering assembly for filtering water and imparting a selected flavor into the water, said assembly comprising:
   a filtration unit having an input and an outlet wherein said inlet input is configured to be fluidly coupled to a fluid source thereby facilitating said outlet to dispense a fluid from the fluid source, said filtration unit including a filtering element being integrated into said input wherein said filtering element is configured to have the fluid pass through said filtering element for filtering the fluid, said filtration unit comprising:
      a housing having a bottom wall, a top wall and an outer wall extending between said bottom wall and said top wall, said input being integrated into said bottom wall, said top wall having a well extending downwardly toward said bottom wall, said well having a lower bounding surface and a lateral bounding surface, said lateral bounding surface being threaded, said lower bounding surface having an output opening extending into an interior of said housing, said lower bounding surface having an input opening extending into said interior of said housing, said outer wall having a first lateral side, a second lateral side and a front side, said first lateral side having a lobe extending laterally away from said first lateral side;
      a faucet having a lower end and an upper end, said lower end being coupled to said top wall of said housing, said faucet being positioned on said lobe, said faucet having a bend being positioned between said lower end and said upper end such that said upper end is directed downwardly;
      a first conduit being fluidly coupled between said input on said bottom wall of said housing and said input opening in said lower bounding surface of said well wherein said input opening is configured to receive the fluid from the fluid source;
      a second conduit being fluidly coupled between said output opening in said lower bounding surface of said well and said lower end of said faucet;
      said filtration element comprises a filter having a lower end and an outside surface, said outside surface having a threaded portion being positioned adjacent to said lower end, said threaded portion threadably engaging said lateral bounding surface of said well in said top wall of said housing wherein said filter is configured to receive the fluid from said input opening and direct the fluid outwardly through said output opening into said faucet thereby facilitating said faucet to dispense the fluid; and
      a valve being integrated into said housing, said valve being in fluid communication with said first conduit, said valve being actuatable into an open condition wherein said valve is configured to facilitate the fluid to flow through said first conduit, said valve being actuatable into a closed condition wherein said valve is configured to inhibit the fluid from flowing through said first conduit, said valve including a handle being pivotally disposed on said second lateral side of said outer wall of said housing, said handle including a block being mechanically coupled to said valve and being spaced from said second lateral side of said outer wall of said housing, said handle including a lever extending upwardly from said block for manipulating said valve between said open condition and said closed condition; and
   a flavor dispenser being integrated into said filtration unit, said flavor dispenser including a plurality of reservoirs, each of said reservoirs containing a respective liquid flavor, a respective one of said reservoirs being actuatable to dispense a pre-determined volume of said respective liquid flavor into said filtration unit when said respective one of said reservoirs is actuated wherein said flavor dispenser is configured to enhance the flavor of the fluid, each of said reservoirs being removably positioned within said housing, each of said reservoirs having an outlet port, said outlet port of each of said reservoirs being in fluid communication with said second conduit for releasing said liquid flavor into said second conduit, said flavor dispenser including:
      a control circuit being positioned within said housing, each of said reservoirs including a dispensing element, said dispensing element in each of said reservoirs being electrically coupled to said control circuit;
      a plurality of buttons, each of said buttons being movably integrated into said front side of said outer wall of said housing, each of said buttons being electrically coupled to said control circuit, each of said buttons being assigned to a respective one of said reservoirs, a respective one of said buttons actuating said dispensing element in said respective reservoir to dispense said pre-determined volume of said liquid flavor when said respective button is depressed;
      a plurality of light emitters, each of said light emitters being integrated into said front side of said outer wall of said housing wherein each of said light emitters is configured to emit light outwardly from said housing, each of said light emitters being electrically coupled to said control circuit, each of said light emitters being assigned to a respective one of said reservoirs, each of said light emitters being aligned with a respective one of said buttons, a respective one of said light emitters being turned on when said dispensing element in said respective reservoir senses the level of said liquid flavor in said respective reservoir has fallen below a pre-determined volume wherein said light emitters are configured visually communicate when any of said reservoirs is depleted of said liquid flavor; and
      a power supply being positioned within said housing, said power supply being electrically coupled to said control circuit, said power supply comprising at least one battery.

* * * * *